(12) United States Patent
Herold

(10) Patent No.: US 6,739,038 B2
(45) Date of Patent: May 25, 2004

(54) PORTABLE BELT LACER

(75) Inventor: Wolfgang Herold, Offenbach/Main (DE)

(73) Assignee: MATO Maschinen-und Metallwarenfabrik Curt Matthaei GmbH & Co. KG, Offenbach (DE)

( * ) Notice: Subject to any disclaimer, the term of this patent is extended or adjusted under 35 U.S.C. 154(b) by 39 days.

(21) Appl. No.: 10/106,792

(22) Filed: Mar. 26, 2002

(65) Prior Publication Data

US 2002/0139644 A1 Oct. 3, 2002

(30) Foreign Application Priority Data

Mar. 27, 2001 (EP) .............................. 01107569

(51) Int. Cl.$^7$ ................................ B23P 19/00
(52) U.S. Cl. ..................... 29/798; 29/243.51; 29/432.1
(58) Field of Search .............................. 29/798, 243.51, 29/464, 271, 468, 432.1; 227/147

(56) References Cited

U.S. PATENT DOCUMENTS

| | | | | |
|---|---|---|---|---|
| 3,101,481 A | * | 8/1963 | Neale ..................... | 29/243.51 |
| 4,144,628 A | * | 3/1979 | Schick .................... | 29/243.51 |
| 4,538,755 A | | 9/1985 | Schick | |
| 4,688,711 A | * | 8/1987 | Gladding et al. ......... | 29/243.51 |
| 5,095,590 A | | 3/1992 | Schick | |
| 5,368,214 A | * | 11/1994 | Schick ................... | 29/243.51 |
| 5,487,217 A | * | 1/1996 | Richardson et al. ........ | 29/798 |
| 5,524,808 A | * | 6/1996 | Vogrig .................... | 29/243.51 |
| 5,544,801 A | * | 8/1996 | Schick ................... | 29/243.51 |
| 5,644,836 A | * | 7/1997 | Schick ................... | 29/798 |
| 6,081,995 A | * | 7/2000 | Herold ................... | 29/798 |

FOREIGN PATENT DOCUMENTS

| | | |
|---|---|---|
| DE | 4140743 A1 | 6/1993 |
| GB | 508624 | 7/1939 |

\* cited by examiner

Primary Examiner—David P. Bryant
(74) Attorney, Agent, or Firm—Price, Heneveld, Cooper, DeWitt & Litton, LLP

(57) ABSTRACT

A portable belt lacer fastens to an associated belt end a plurality of side-by-side connectors of the type having opposing shanks interconnected by central eye loops with staples that extend through the opposing shanks and the associated belt end. The belt lacer includes a bending die configured to bend free ends of the staples upon penetration into and through the associated belt end, and a press head operably connected with said bending die with a die that is shifted vertically in the direction of said bending die to insert the staples. Positioners upstanding from the bending die are configured to abuttingly engage the connectors to precisely locate the same on the bending die, and a centering rod is inserted through the eye loops of the connectors, and is laterally shiftable toward and away from the bending die, such that the connectors are accurately and positively positioned along the associated belt end by capturing the connectors between the positioners and the centering rod.

24 Claims, 6 Drawing Sheets

PORTABLE BELT LACER

BACKGROUND OF THE INVENTION

The present invention relates to belt lacers of the type used to fasten connectors onto the ends of conveyor belts and the like, and in particular to a portable belt lacer.

When fastening belt connectors or their connective fasteners onto the ends of conveyor belts, power belts, or the like, one problem is ensuring a precise penetration of the holding staples, the tips of which have been placed in the holes of the upper fastener shank, into the holes of the lower fastener shanks that are positioned in the bending die, i.e., subsequent to penetration of the belt end concerned. In the course of fastening the connective fasteners, the upper fastening shanks are pressed down upon the surface of the belt. A precise motion of the fastener shanks towards one another must be ensured both for different wall thicknesses, as well as for different belt elasticities and other belt characteristics.

For this reason, the user often selects a sufficiently large amount of play between the fastening shanks and associated connector holes. However, this results in diminished fastening strength of the connective fasteners and ultimately of the belt connectors relative to fastener location and hold. If connective fasteners of relatively strong material are used instead, positioning of the connective fasteners during fastening of the connective fasteners is simplified and, in particular, a relatively slight amount of "hole play" is made possible. However, the deformative forces required during attachment of such belt connectors are quite high.

DE 41 40 743 A1 discloses a device of the above-named type in which connective fasteners of comparatively thin sheet metal material are used, whereby the eye loops are produced from the sheet metal material as folded loops of U-shaped cross section to increase resistance to stress and wear. This thin sheet metal material requires guide holes for the holding staples with the smallest possible amount of guide play in order to achieve a flawless seating and hold of the connective fasteners and, consequently, for the belt connectors, onto the ends of the belts. The complicated interaction of the individual centering agents is a disadvantage of this device, which also causes the device to be quite expensive in construction. Aside from this, the rod, which can be slid into the bending die and which the eye loops of the connective fasteners wrap around, performs no centering function in this device. Finally, the device does not allow itself to be converted to other sizes of belt connectors. Furthermore, it does not allow precise contact of the connective fasteners in the channel of the press head upon initial centering of the press head over the bending die via a peg connected to the press head, which peg can be placed in a centering bore of the bending die.

In contrast to such prior art devices, in the present invention, because of the tight motion tolerances desired, diverse centering devices are provided in order to guarantee a flawless introduction of the holding staples into the guide holes of the lower fastener shank upon driving in the holding staples. Hence, one side of the bending die has centering lamellae or elements between the eye loops that connect the fastener shanks of the respective connective fasteners, and the other side has centering wedges or pins that fit within V-shaped recesses on the back side of the fastener shanks lying upon the die. Additionally, the underside of the press head is provided with a centering stop for the back sided end of the upper fastener shank of the connective fasteners.

SUMMARY OF THE INVENTION

One object of the invention is to provide a device of the above-named type in such a way that an optimal centering of the belt connectors can be achieved during their fastening onto the belt using agents of simple construction.

Another object is achieved for a device of the above-mentioned type in that the centering of the connective fasteners is achieved via the means which articulate between the eye loops, as well as via the rod, whereby the centering rod that is slid into the bending die positions the connective fasteners against the centering means found between the eye loops.

In the device according to the present invention, the rod therefore takes on the function of a component which facilitates centering. Upon sliding the rod into the connective fasteners that have been placed upon the bending die, the rod contacts the eye loops of the connective fasteners and positions the connective fasteners against the centering means or members which are found between the eye loops. The centering members arranged between the eye loops are constructed as pins according to a particular embodiment of the invention. Aside from these centering means, specifically the rod and the pins, the device according to the present invention fundamentally requires no further centering mechanisms.

Since the centering members that fit between the eye loops are constructed as pins according to the preferred embodiment of the invention, these centering members require only a small amount of space, such that sufficient room remains for sliding in the rod. The rod represents a fixed pivotal axis for the connective fasteners, in that the possibility exists to bend those fastener shanks of the connective fasteners, which are impinged via upper die and the connective fasteners, around this fixed axis until these fastener shanks contact the belt. In this fashion, it is ensured that said fastener shanks are bent in a specific, predefined manner, in a position in which the holes of the corresponding fastener shanks, which incorporate the belt between them, are aligned with one another.

According to a particular embodiment of the invention, it is foreseen that the rod is slidably mounted in the bending die, parallel to the axis of the rod. On the one hand, this enables optimization of rod position relative to the connective fasteners, specifically to the eye loops of the connective fasteners, such that the rod lies against the eye loops and thus takes on the function of a centering means or member. On the other hand, the adjustability of the rod allows different sizes of belt connectors to be processed in the same bending die. The various sizes of belt connectors differ in the length of the fastener shanks in particular, so that, at an unchanged position of the connective fasteners relative to the bending die, only the position of the rod needs to be changed for the purpose of contacting the eye loops of the connective fasteners.

In particular, the rod is mounted such that it is continuously slidable in parallel, although the adjusting agents for sliding the rod are self-limiting. This ensures for all rod positions that the rod will not slide in the direction of any transverse forces acting upon it whenever such transverse forces occur.

As a general rule, it is not necessary to provide for more than two different parallel rod positions, in order to position more than two sizes of belt connectors. In order to bring about the positioning of two belt connector sizes, axial translocation or shifting of the mounting elements for the rod, combined with a rotational motion of the mounting elements by 180 degrees, are advantageously provided. The rod can thus be slid into the same bores of the mounting elements.

According to a preferred embodiment of the invention, it is provided that the rod is mounted in aligned bore holes of mounting elements that can be slid by means of the adjusting members, whereby the mounting elements have stops for the belt end that has been placed between the fastener shanks of the connective fasteners. A corresponding parallel repositioning of the stop for the current belt end to be processed therefore goes along with parallel repositioning of the rod.

According to one embodiment of the invention, it is foreseen that the bending die has reversing recesses for reverse bending the tips of the holding staples, whereby the reversing recesses are of shallow construction. In the area of the connective fasteners, the belt connection is consequently very shallow in relation to conveyor belt thickness. The bending forces generated during the reversing of the tips of the holding staples are also absorbed by the centering members. Shallow reversing recesses are understood to mean those which have no greater depth than the thickness of the respective fastener shanks relative to their dimension in the direction of conveyor belt thickness. Contrary to various prior art, it is, in particular, not necessary to bend back the end sections of the holding staples in the direction of the respective fastener shanks so that these end sections traverse holes in the fastener shanks.

Based on the centering of the connective fasteners via the centering members according to the present invention, one can forego the need for centering means or agents in the area of the upper die. To this extent, it is considered expedient for the upper die to have a planar upper die face, in particular to have a planar upper die face that strikes the holding staples at an angle. This angle corresponds to less than 10 degrees, whereby the upper die is oriented such that, on the basis of the design of its inclined upper die face, it initially strikes that area of the respective holding staples that faces the free end of the fastener shank. Correspondingly, the press head, which comes into contact with the fastener shanks, preferably also has an inclined contact face. As a result, upon placing the press head on the belt connector and/or upon inducement of an upper die force, those areas of the belt connector that face away from the eye loops are contacted or impinged first. The main compressive forces are thus introduced into the belt connector at a large distance from the rod.

It is considered particularly advantageous if the press head and the bending die can be centered by means of pegs, whereby the respective peg is spring mounted. On the basis of this construction, it is, in particular, possible to use connective fasteners having a V-shaped design, rather than a U-shaped design, in their initial configuration, i.e., prior to bending together. Placement of the press head onto the holding staples can occur with the press head at an inclined arrangement to the bending die corresponding to the open angle of the fastener shank, whereby the peg has not yet centered the press head and the bending die, but is instead retracted into the press head or the bending die in opposition to the force of a spring, depending upon in which of these parts said peg is mounted. Not until the fastener legs have assumed their U-shaped form under the influence of the weight of the press head, or that of an external force applied to the press head, does the peg, under the force of the spring, move into the complementary bending die to center the parts.

Further features of the invention are presented in the description of the figures and in the figures themselves, whereby it is noted that all individual features and all combinations of individual features are essential to the invention.

These and other advantages of the invention will be further understood and appreciated by those skilled in the art by reference to the following written specification, claims and appended drawings.

BRIEF DESCRIPTION OF THE DRAWINGS

The invention is represented in the figures on the basis of a preferred embodiment, without being limited to it. Represented are:

FIG. 6 is a sectional view of the device according to the representation in FIG. 3, showing the fastener shanks bending together prior to pressing the holding staples through;

FIG. 7 is a sectional view to FIG. 6, where the holding staples have been partially pressed through.

DETAILED DESCRIPTION OF THE PREFERRED EMBODIMENTS

Figure 1:
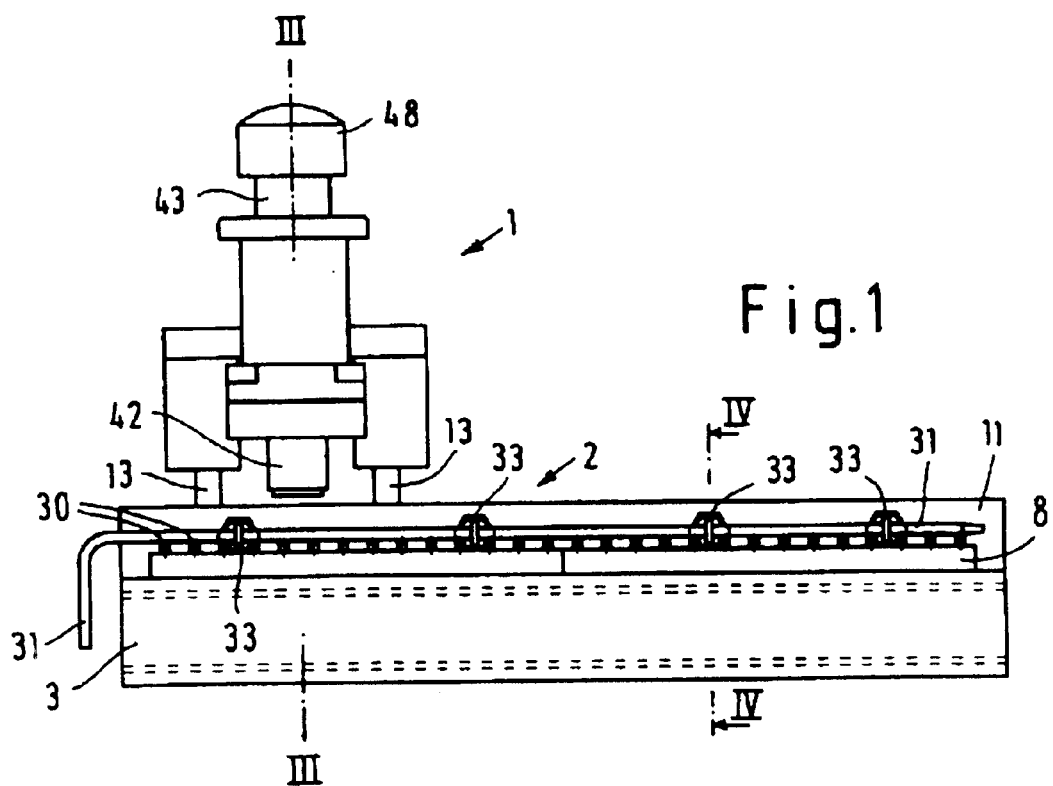
FIG. 1 is a front view of a portable belt lacer embodying the present invention, without conveyor belt and belt connectors having been placed therein.
Figure 2:
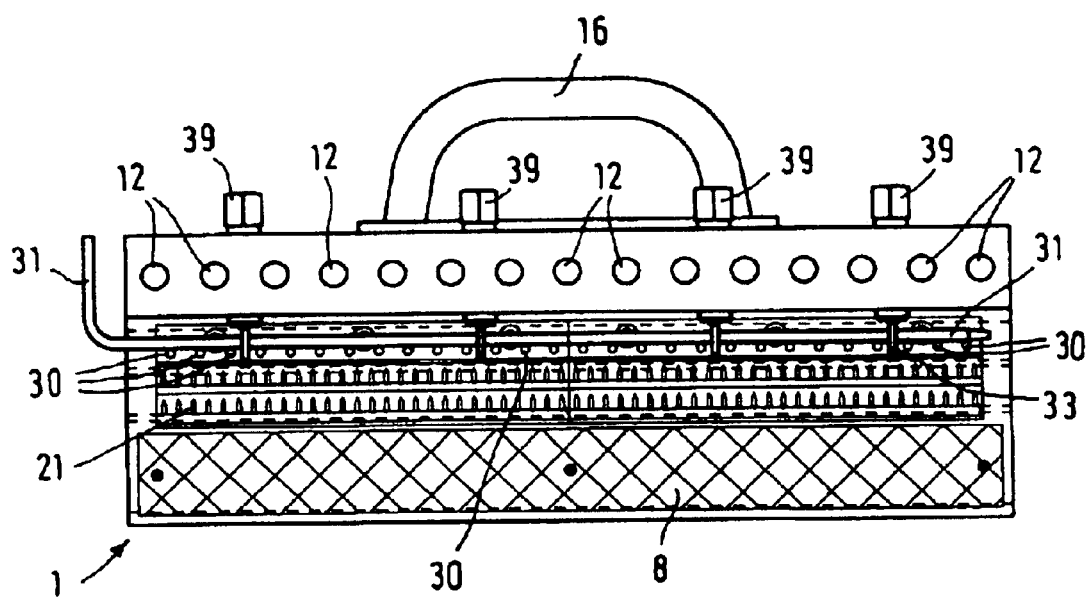
FIG. 2 is a plan view of a bending die shown in FIG. 1 along with other elements.

For purposes of description herein, the terms "upper", "lower", "right", "left", "rear", "front", "vertical", "horizontal" and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The illustrated device for fastening belt connectors onto conveyor belts consists essentially of two components, comprising a press head 1 and a bending die 2.

The bending die 2 has a hollow base 3 of rectangular cross section. A snaker or anvil plate 4, which actually executes the bending process, is positioned on top of the base 3 and is connected to the base 3 by means of a large number of screws 5 that are countersunk in the plate 4, whereby these screws traverse bore holes in the upper wall of the base 3 and are threaded into nuts 6 arranged within the base 3. In order to cushion the forces introduced into the base 3 during the bending process, an intermediate spacer 7 is placed in the base 3 and mounted there, such that said spacer contacts the upper and lower walls of the base 3. The anvil plate 4 has a width corresponding to roughly half the width of the base 3.

A support 8 is placed in the area of the other half of the base 3, next to plate 4, which support serves to support the belt end 9 of the conveyor belt 10. A mounting piece 11 in the shape of a right parallelepiped is connected to the lateral wall of the base 3 that faces the anvil plate 4, which piece is provided with a large number of through holes 12 oriented perpendicular to the upper wall of the base 3. Each of the two through holes 12, at a distance of four through holes 12, serves to accept two centering pegs 13 of the press head 1. Attachment of the mounting piece 11 to the base 3 is accomplished by means of multiple screws 15 that are threaded into nuts 14. In the central area, relative to the longitudinal extension of the mounting piece 11, a handle 16 is connected to those screw bolts that pass through the mounting piece 11 and are threaded into the nuts 14. By grasping the handle 16, the bending die 2 can be transported, along with the attached press head 1, as necessary.

On the side oriented away from the base 3, the anvil plate 4, which extends in the longitudinal direction of the base 3, has a planar bearing surface 17 for the lower fastener shank 18 of the connective fasteners 19 of the belt connector 20. The planar bearing surface 17 is provided with shallowly constructed reversing recesses 21 for reverse bending the holding staples 22 which are pushed through during the fastening of the belt connectors. These to staples consist of staple legs 23 that are pointed in the area of their free ends and a crosspiece 24 which connects them at a right angle. The illustrated belt connectors 20 have fastener shanks arranged in a V-shape as relates to their initial condition before attaching them to the conveyor belts, and lower fastener shanks 18 and upper fastener shanks 25 that are connected by means of an eye loop 26. In order to position the connective fasteners next to one another in predefined fashion, in particular at exact parallel relationship, two rods 27 are provided which contact the upper side of the lower fastener shank 18 and are welded or otherwise attached to it.

Each fastener shank 18, 25 has two or four holes 28, 29, depending on whether the fastener shank in question serves to accommodate one or two holding staples 22. Relative to the initial position of the belt connectors, the respective holding staple 22 is put into the holes 29 of the upper fastener shank 25, whereby the tips of the staple legs 23 of the holding staple 22 project slightly beyond the lower surface of the upper fastener shank 25. During attachment of the belt connectors 20 to the conveyor belt 10, which will be explained in greater detail below, the respective holding staple 22 is advanced in the direction of the lower fastener shank 18, whereby the holding staple 22, with its leading pointed areas of the staple legs 23, is introduced into the holes 28 of the lower fastener shank 18. Upon further pressing of the staples 22, the free ends of staple legs 23 contact the anvil plate 4 and are reverse bent in the direction of the mounting piece 11 within the area of the reversing recesses 21.

Figure 4:
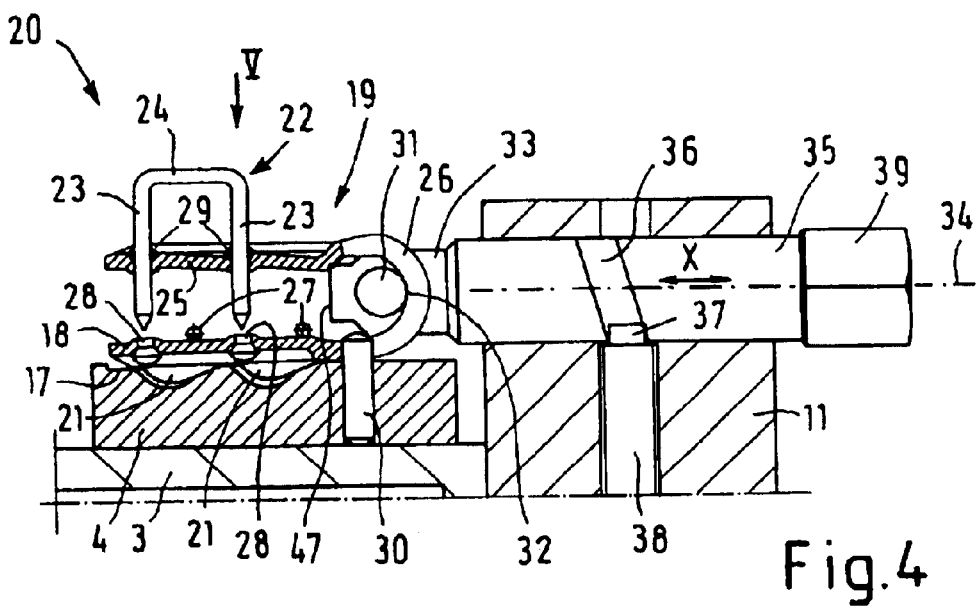
FIG. 4 is a detail sectional view of the bending die, taken along line IV—IV of FIG. 1.
Figure 5:
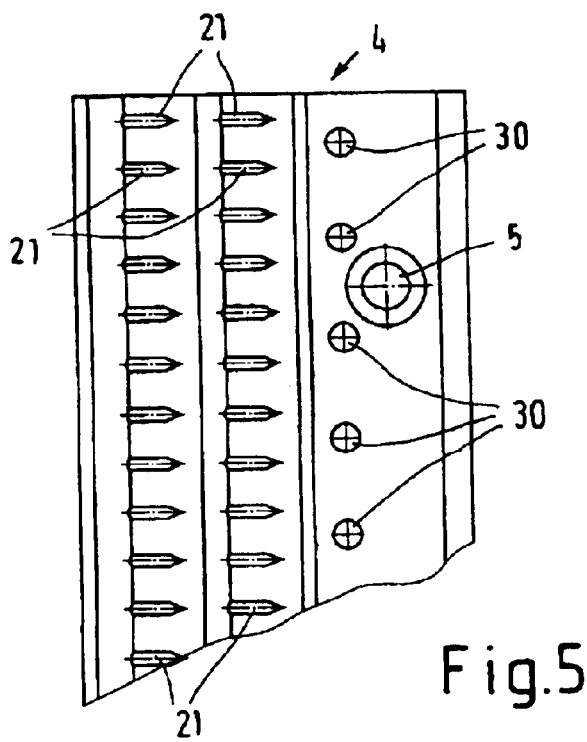
FIG. 5 is a detail view "V" of the bending die according to FIG. 4.

Centering agents or members are provided to position the belt connectors 20 onto the conveyor belt in precise, pre-defined fashion during fastening. In the illustrated example, centering pins 30 are set in bore holes of the anvil plate 4. The centering pins 30 are arranged parallel to the through holes 12 in the mounting piece 11, whereby a large number of centering pins 30 are positioned in the longitudinal direction of the anvil plate 4. Each centering pin 30 projects far enough above the planar bearing surface 17 of the anvil plate 4, so as to roughly coincide with the upper contour of the lower fastener shank 18 of connective fasteners 19 when placed upon the anvil plate 4. If the respective connective fastener 19 has two identical eye loops 26 that are arranged parallel to one another and which connect the two fastener shanks 18 and 25, the respective centering pin 30 fits between the eye loops 26 of these connective fasteners 19, and indeed, as in the representation in FIG. 4, in the area in which the eye loops 26 transition into the lower fastener shank 18. The centering pin 30 could fundamentally also fit between adjacent connective fasteners 19, if they have only one eye loop 26. A centering rod 31 is provided as a further centering agent or member, which contacts the connective fasteners 19 in the inner vertex 32 of the eye loops 26. The centering rod 31 is placed with a minimum amount of play through aligned bore holes of mounting elements 33 that are freely rotatable about an axis 34, but held axially fixed in a cylindrical adjusting member 35. The respective adjusting member 35 traverses a bore hole in the mounting piece 11 and said member is provided with an exterior, inclined groove 36. An extension 37 of a bolt 38 mounted in the mounting piece 11 articulates with said groove. A finger tight adjusting knob 39 is connected to the adjusting member 35 on the side facing away from the respective mounting element 33. Upon turning the adjusting knob 39, the adjusting member 35, and hence the mounting element 33, are moved axially in the direction of the double arrow X according to the predetermined direction of rotation.

The centering rod 31 can thus be shifted or slid by means of the four existing adjusting members 35. It is to be understood that it is not necessary for the respective mounting element 33 and the associated cylindrical adjusting agent 35 to be made up of two separate components. If these design elements were formed as one physical unit, then it can be rotated by 180 degrees upon removal of the centering rod 31, so that the centering rod 31 could then be placed through the sections of mounting element 33 at the position of the component that has now been slid axially by a predefined amount. If the adjusting knobs 39 are constructed as nuts, one can clearly determine from the respective upper surfaces of the adjusting knobs 39 into which of the two possible parallel positions the centering rod 31 has been slid and hence for which size belt connector the device has been set.

The illustrated press head 1 is provided with a handle 40. The press head 1 has a thick walled press head sleeve 42 with a guide channel 41. A reciprocating or depressible upper die 43 is guided within the guide channel 41, which die is non-rotatably mounted within the press head 1. The leading upper die face 44 and also the leading surface 45 of the press head sleeve 42 are arranged at an angle of greater than 90 degrees, and up to 100 degrees, relative to the axis of motion of the upper die 43, such that that die area and/or that area of the press head sleeve 42, which is directed toward the staple leg 23 of the holding staple 22 that is directed away from the eye loop 26, leads. In the area of its two staple legs 23, the respective holding staple 22 is guided within the guide channel 41, at least in relation to the longitudinal extension of the crosspiece 24.

Both centering pegs 13 are mounted in the press head 1 in axially slidable fashion, and are biased outwardly by compression springs 46. The upper interior faces of mounting pieces 11 are tapered or flared outwardly to receive or guide centering pegs 13 therein, as explained in greater detail below.

In order to fasten a row of belt connectors 20 onto the end of the conveyor belt 10, the belt connectors 20 are placed on the anvil plate 4, with the lower fastener shank 18 positioned against the centering pins 30. After pre-positioning the adjusting members 35, the centering rod 31 is either slid through the bore holes of the mounting elements 33, or else the centering rod 31 is first placed through the bore holes of the mounting elements 33, and then the centering rod 31 is slid in parallel to its centering position, in which it lies against the eye loops 26 of the connective fasteners 19 in the area of the vertex 32. The end 9 of the conveyor belt 10 is then placed between the spread, V-shaped fastener shanks 18 and 25 onto the support 8, whereby the end surface of the conveyor belt 10 contacts the stopping faces 47 of the mounting elements 33.

Figure 3:
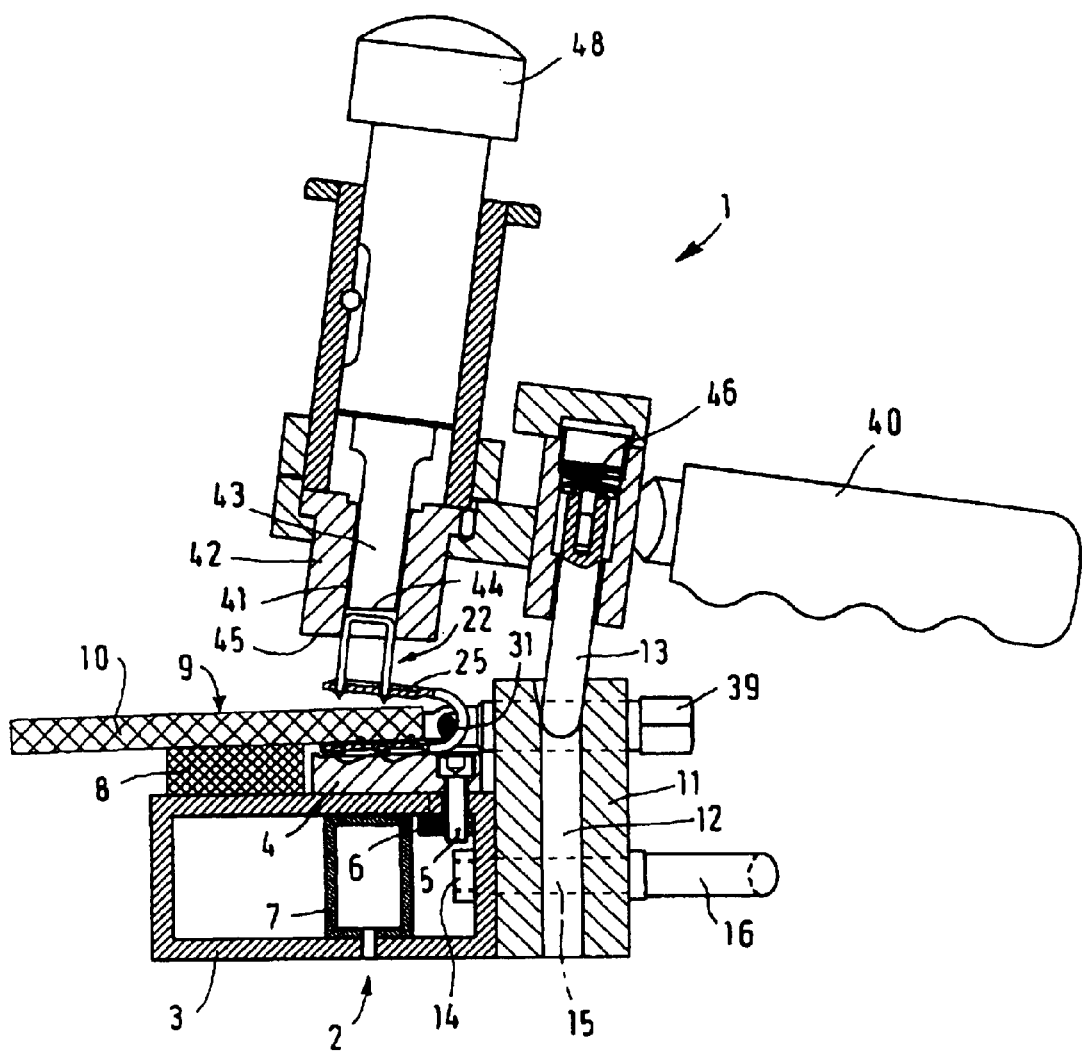
FIG. 3 is a section through the device shown in FIG. 1, taken along the line III—III, with conveyor belt and belt connectors having been placed therein, prior to deformation of the belt connectors.
Figure 6:
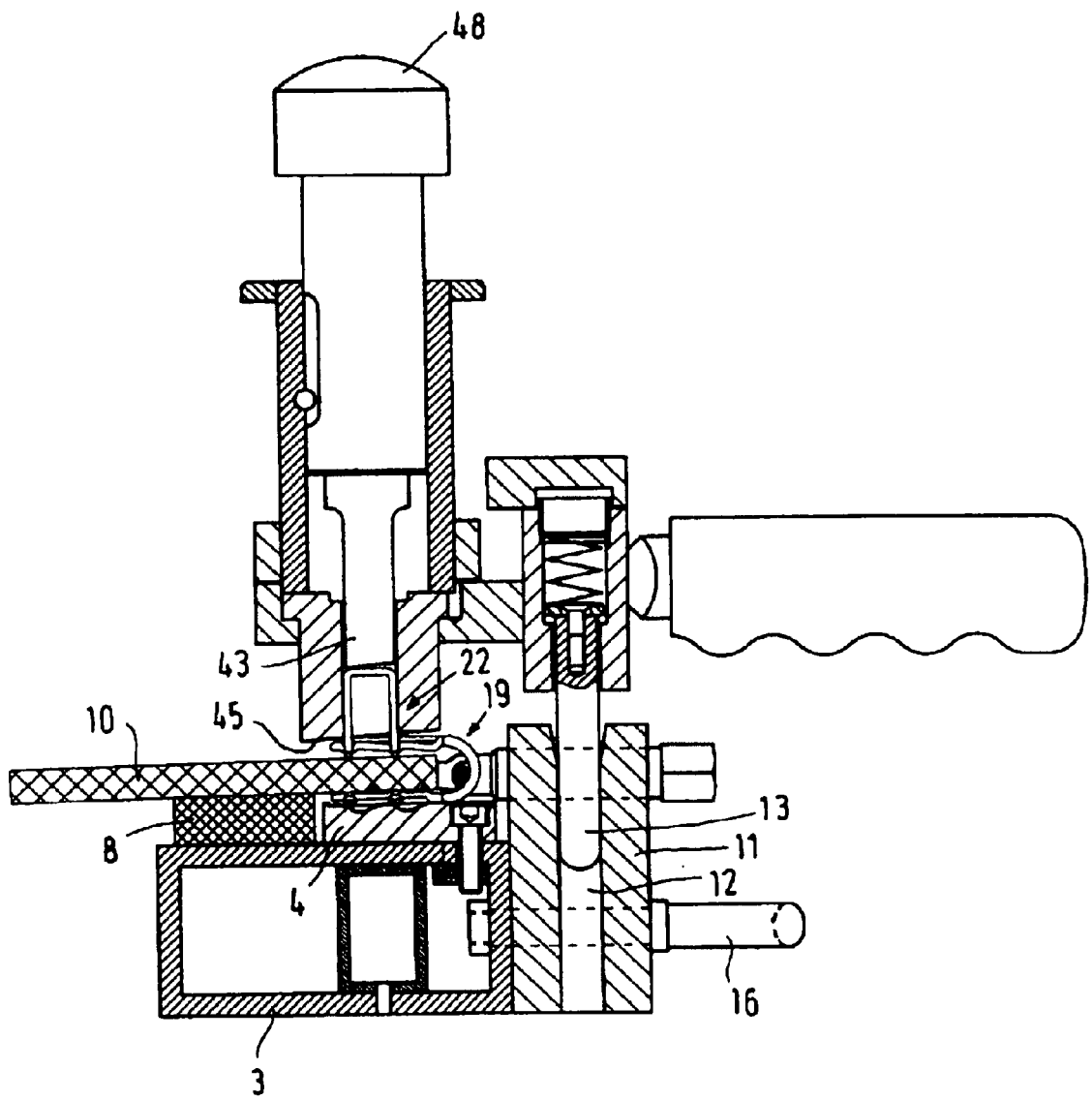
Figure 7:
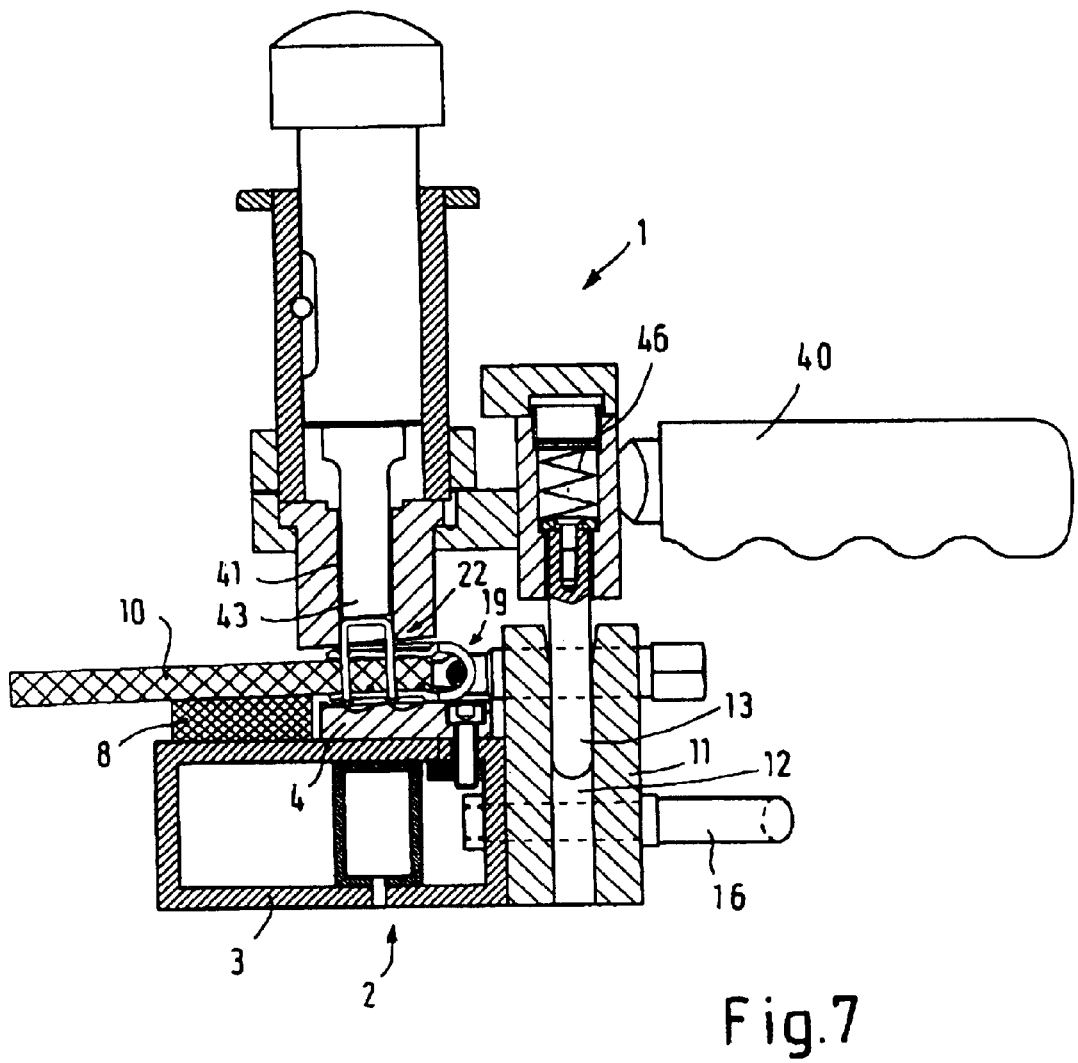
Figure 8:
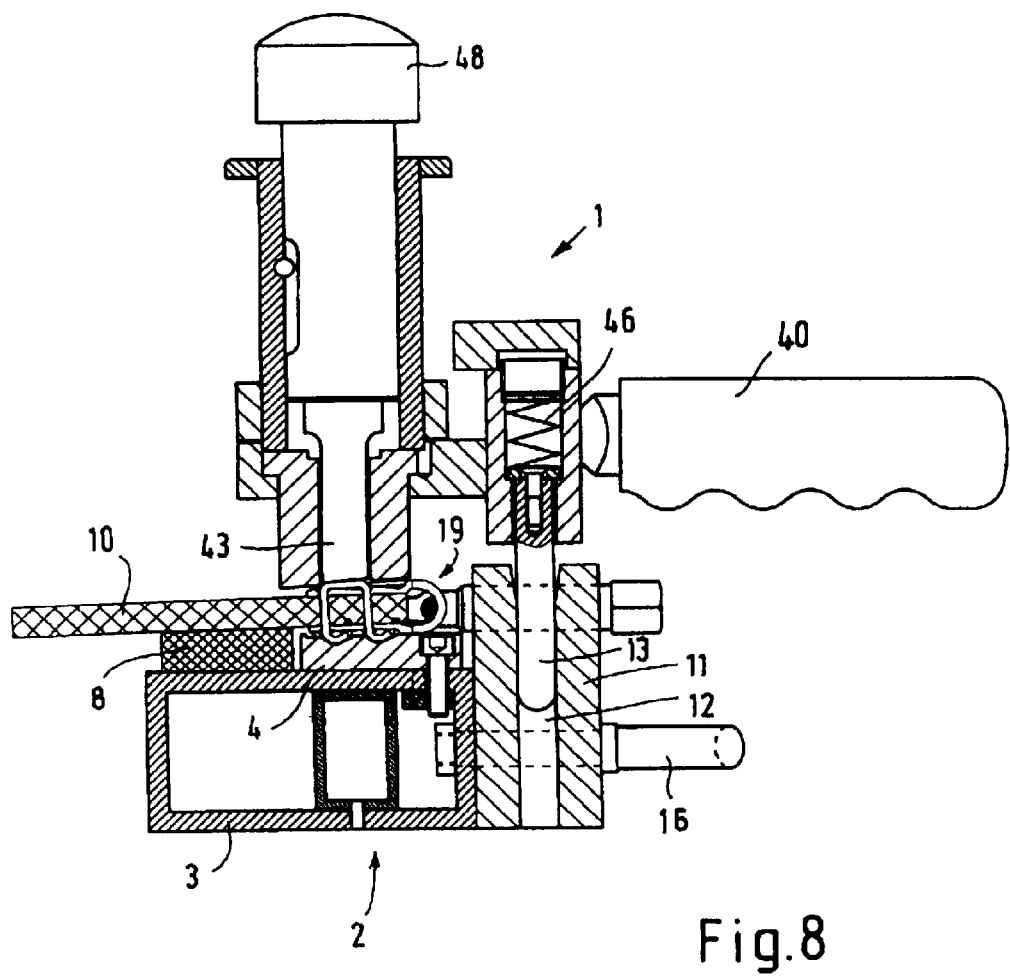
FIG. 8 is a sectional view according to FIGS. 6 and 7, upon completion of the fastening process.

In this initial position, the press head 1 is placed upon the bending die 2 in the manner illustrated in FIG. 3, whereby the two centering pegs 13 are fully retracted into the press head 1 on account of the placement position, which is just slightly out of plumb or vertical. Because of the weight of the press head 1, the respective upper fastener shank 25 of the connective fastener 19 is pressed down against the belt 10 once said head is placed upon the bending die 2, whereby the upper die 43 moves up out of the way. As a result of the slight tipping motion of the press head 1, which takes place relative to the bending die 2, the centering pegs 13 are shifted into an aligned position to the through holes 12 of the bending die 2, such that the centering pegs 13, under the influence of the compression springs 46, extend out of the press head, and are received completely into the bending die 2. This relationship is illustrated in FIG. 6. The expanded section 48 of the upper die 43, which sticks out of the top of the press head 1, is subsequently impacted or impinged via the effect of a hammer or the like, and hence the upper die 43 is driven downward. The respective holding staple 22 is driven through the conveyor belt 10 and the lower fastener shank 18 of the connective fastener 19 by means of the upper die 43 in the previously described sense, and bent along the anvil plate 4 in the direction of the eye loop 26 of the connective fastener 19. An intermediate step of the connection process is illustrated in FIG. 7, and the completed connection process is shown in FIG. 8. The angled surfaces of the upper die 43 and the press head sleeve 42 prevent the fastener shanks from moving away in the direction of their free ends.

In each case, impacting or impingement of the press head 1 results in the connection of only a few (e.g., one or two) of the connective fasteners 19 with the conveyor belt 10. Consequently, the press head 1 is removed from the bending die 2 following the connection, and shifted laterally to the next connective fastener(s) 19 slated for connection, i.e., transferred laterally by the desired number of through holes 12. The process shown in FIG. 3 and FIGS. 6 to 8 is then repeated.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. An apparatus for fastening to an associated belt end a plurality of side-by-side connectors of the type having opposing shanks interconnected by central eye loops with staples that extend through the opposing shanks and the associated belt end therebetween, comprising:
   a bending die configured to bend free ends of the staples upon penetration into and through the associated belt end;
   a press head operably connected with said bending die, and including a die that is shifted generally vertically in the direction of said bending die to drive the free ends of the staples through the opposed shanks of the connectors and the associated belt end positioned therebetween;
   positioners upstanding from said bending die, and configured to abuttingly engage the connectors to precisely locate the same on said bending die;
   a centering rod configured to be inserted through the eye loops of the connectors; and
   an adjusting member connected with said centering rod, and shifting said centering rod in a direction generally parallel with said bending die, such that the connectors are accurately and positively positioned along the associated belt end by capturing the connectors between said positioners and said centering rod.

2. An apparatus as set forth in claim 1, wherein:
said positioners comprise pins.

3. An apparatus as set forth in claim 2, wherein:
said centering rod is supported relative to said bending die such that it can be slid longitudinally relative to the eye loops of the connectors.

4. An apparatus as set forth in claim 3, wherein:
said adjusting member comprises a plurality of adjusting members for sliding said centering rod relative to said bending die.

5. An apparatus as set forth in claim 4, including:
slidable mounting elements having apertures in which said centering rod is retained, and stopping faces; and
adjusting means operably connected with said mounting elements, whereby the belt end is placed between the shanks of the connectors and abuts said stopping faces.

6. An apparatus as set forth in claim 5, wherein:
the central eye loops each include a vertex portion; and
said centering rod is configured to contact the connectors in the vertex portion of the central eye loops.

7. An apparatus as set forth in claim 6, wherein:
said bending die includes shallow recesses for reverse bending the free ends of the staples.

8. An apparatus as set forth in claim 7, wherein:
said press head includes an upper die having a planar upper die face shaped to strike the staples at an angle.

9. An apparatus as set forth in claim 8, wherein:
said press head has a planar contact surface for contacting upper ones of the shanks at an angle.

10. An apparatus as set forth in claim 9, wherein:
said press head includes spring loaded pegs slidably mounted for movement in a longitudinal direction, and configured to be received in said bending die.

11. An apparatus as set forth in claim 10, wherein:
said pegs are received in centering bores in said bending die.

12. An apparatus as set forth in claim 1, wherein:
said centering rod is supported relative to said bending die such that it can be slid longitudinally relative to the eye loops of the connectors.

13. An apparatus as set forth in claim 1, wherein:
said adjusting member comprises a plurality of adjusting members for sliding said centering rod relative to said bending die.

14. An apparatus as set forth in claim 1, including:
slidable mounting elements having apertures in which said centering rod is retained, and stopping faces; and
adjusting means operably connected with said mounting elements, whereby the belt end is placed between the shanks of the connectors and abuts said stopping faces.

15. An apparatus as set forth in claim 1, wherein:
the central eye loops each include a vertex portion; and
said centering rod is configured to contact the connectors in the vertex portion of the central eye loops.

16. An apparatus as set forth in claim 1, wherein:
said bending die includes shallow recesses for reverse bending the free ends of the staples.

17. An apparatus as set forth in claim 1, wherein:
said press head includes an upper die having a planar upper die face shaped to strike the staples at an angle.

18. An apparatus as set forth in claim 1, wherein:
said press head has a planar contact surface for contacting upper ones of the shanks at an angle.

19. An apparatus as set forth in claim 1, wherein:
said press head includes spring loaded pegs slidably mounted for movement in a longitudinal direction, and configured to be received in said bending die.

20. An apparatus as set forth in claim 19, wherein:
said pegs are received in centering bores in said bending die.

21. An apparatus for fastening to an associated belt end a plurality of side-by-side connectors of the type having opposing shanks interconnected by central eye loops with staples that extend through the opposing shanks and the associated belt end therebetween, comprising:
  a bending die configured to bend free ends of the staples upon penetration into and through the associated belt end;
  a press head operably connected with said bending die, and including a die that is shifted generally vertically in the direction of said bending die to drive the free ends of the staples through the opposed shanks of the connectors and the associated belt end positioned therebetween;
  positioners upstanding from said bending die, and configured to abuttingly engage the connectors to precisely locate the same on said bending die;
  a centering rod configured to be inserted through the eye loops of said connectors, and being shiftable in a direction generally parallel with said bending die, such that said connectors are accurately and positively positioned along the associated belt end by capturing the connectors between said positioners and said centering rod; and
  adjusting members for sliding said centering rod relative to said bending die.

22. An apparatus for fastening to an associated belt end a plurality of side-by-side connectors of the type having opposing shanks interconnected by central eye loops with staples that extend through the opposing shanks and the associated belt end therebetween, comprising:
  a bending die configured to bend free ends of the staples upon penetration into and through the associated belt end;
  a press head operably connected with said bending die, and including a die that is shifted generally vertically in the direction of said bending die to drive the free ends of the staples through the opposed shanks of the connectors and the associated belt end positioned therebetween;
  positioners upstanding from said bending die, and configured to abuttingly engage the connectors to precisely locate the same on said bending die;
  a centering rod configured to be inserted through the eye loops of said connectors, and being shiftable in a direction generally parallel with said bending die, such that said connectors are accurately and positively positioned along the associated belt end by capturing the connectors between said positioners and said centering rod;
  slidable mounting elements having apertures in which said centering rod is retained, and stopping faces; and
  adjusting means operably connected with said mounting elements, whereby the belt end is placed between the shanks of the connectors and abuts said stopping faces.

23. An apparatus for fastening to an associated belt end a plurality of side-by-side connectors of the type having opposing shanks interconnected by central eye loops with staples that extend through the opposing shanks and the associated belt end therebetween, comprising:
  a bending die configured to bend free ends of the staples upon penetration into and through the associated belt end;
  a press head operably connected with said bending die, and including a die that is shifted generally vertically in the direction of said bending die to drive the free ends of the staples through the opposed shanks of the connectors and the associated belt end positioned therebetween;
  positioners upstanding from said bending die, and configured to abuttingly engage the connectors to precisely locate the same on said bending die;
  a centering rod configured to be inserted through the eye loops of said connectors, and being shiftable in a direction generally parallel with said bending die, such that said connectors are accurately and positively positioned along the associated belt end by capturing the connectors between said positioners and said centering rod; and wherein
  said press head has a planar contact surface for contacting upper ones of the shanks at an angle.

24. An apparatus for fastening to an associated belt end a plurality of side-by-side connectors of the type having opposing shanks interconnected by central eye loops with staples that extend through the opposing shanks and the associated belt end therebetween, comprising:
  a bending die configured to bend free ends of the staples upon penetration into and through the associated belt end;
  a press head operably connected with said bending die, and including a die that is shifted generally vertically in the direction of said bending die to drive the free ends of the staples through the opposed shanks of the connectors and the associated belt end positioned therebetween;
  positioners upstanding from said bending die, and configured to abuttingly engage the connectors to precisely locate the same on said bending die;
  a centering rod configured to be inserted through the eye loops of said connectors, and being shiftable in a direction generally parallel with said bending die, such that said connectors are accurately and positively positioned along the associated belt end by capturing the connectors between said positioners and said centering rod; and wherein
  said press includes spring loaded pegs slidably mounted for movement in a longitudinal direction, and configured to be received in said bending die.

* * * * *